(12) United States Patent
Yuasa et al.

(10) Patent No.: US 6,366,909 B1
(45) Date of Patent: Apr. 2, 2002

(54) INFORMATION PRESENTATION APPARATUS AND INFORMATION PRESENTATION METHOD

(75) Inventors: Toshiyuki Yuasa, Machida; Takaaki Yamada, Yokohama; Hiroyuki Kojima, Nishinomiya; Masato Tsuchibora, Nagoya, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/178,540

(22) Filed: Oct. 26, 1998

(30) Foreign Application Priority Data

Oct. 24, 1997 (JP) .............................................. 9-310033

(51) Int. Cl.$^7$ ............................................. G06F 17/30
(52) U.S. Cl. .................................... 707/4; 707/3; 707/5
(58) Field of Search .............................. 707/5, 10, 104, 707/3, 4; 709/223

(56) References Cited

U.S. PATENT DOCUMENTS

| | | | | |
|---|---|---|---|---|
| 5,175,814 A | * | 12/1992 | Anick et al. ................. | 345/348 |
| 5,603,021 A | * | 2/1997 | Spencer et al. ............. | 345/604 |
| 5,778,362 A | * | 7/1998 | Deerwester ..................... | 707/5 |
| 5,873,081 A | * | 2/1999 | Harel ............................. | 707/3 |
| 5,930,474 A | * | 7/1999 | Dunworth et al. ........... | 709/217 |
| 5,958,008 A | * | 9/1999 | Pogrebisky et al. ......... | 709/223 |
| 5,974,572 A | * | 10/1999 | Weinberg et al. ............ | 714/47 |
| 6,067,539 A | * | 5/2000 | Cohen ........................... | 707/2 |
| 6,112,201 A | * | 8/2000 | Wical ............................ | 707/5 |

* cited by examiner

*Primary Examiner*—Paul R. Lintz
(74) *Attorney, Agent, or Firm*—Antonelli, Terry, Stout & Kraus, LLP

(57) ABSTRACT

An information presentation apparatus includes an information organization structure editing unit, a search condition creating unit, an information collection unit, and a collection result joining unit. The editing unit prompts a user to enter plural terms and one or more relations among said terms and store them as an information organization structure. The search condition creating unit creates a search condition of information from the terms and the relations among the terms stored in the information organization structure. The information collection unit searches information storage by using the created search condition and collect location information of the data meeting the search condition. The collection result joining unit visually joins the terms and the relations among the terms stored in the information organization structure with the location information of the searched data and displays the joined result.

8 Claims, 20 Drawing Sheets

1. "PROMOTION OF FINANCING" . AND . "BENEFIT IMPROVEMENT OF TRANSACTIONS" .AND. "MEASURES"

2. "PROMOTION OF FINANCING" . AND . "BENEFIT IMPROVEMENT OF TRANSACTIONS" .AND. "NEGOTIATION ABOUT IMPROVEMENT OF TRANSACTIONS"

3. "PROMOTION OF FINANCING" . AND . "BENEFIT IMPROVEMENT OF TRANSACTIONS" .AND. "PRESENTATION OF TRANSACTIONS MENU"

FIG. 6A

|  | COMMENT (6011) | CASE DOCUMENT (6012) |
|---|---|---|
| IMPACT LOAN (6021) |  |  |
| APARTMENT LOAN (6022) |  |  |
| FREE LOAN (6023) |  |  |
| SPREAD LENDING (6024) |  |  |

FIG. 6B

1. "IMPACT LOAN" .AND. "COMENT"

2. "IMPACT LOAN" .AND. "CASE DOCUMENT"

3. "APARTMENT LOAN" .AND. "COMMENT"

1. "A SHOP"

2. "B BUILDING FIRM"

3. "C COMPANY"

FIG. 8A
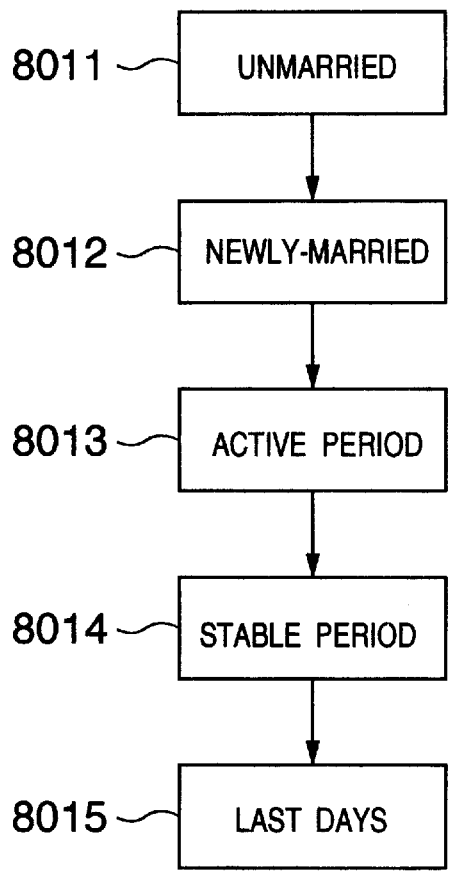
FIG. 8B
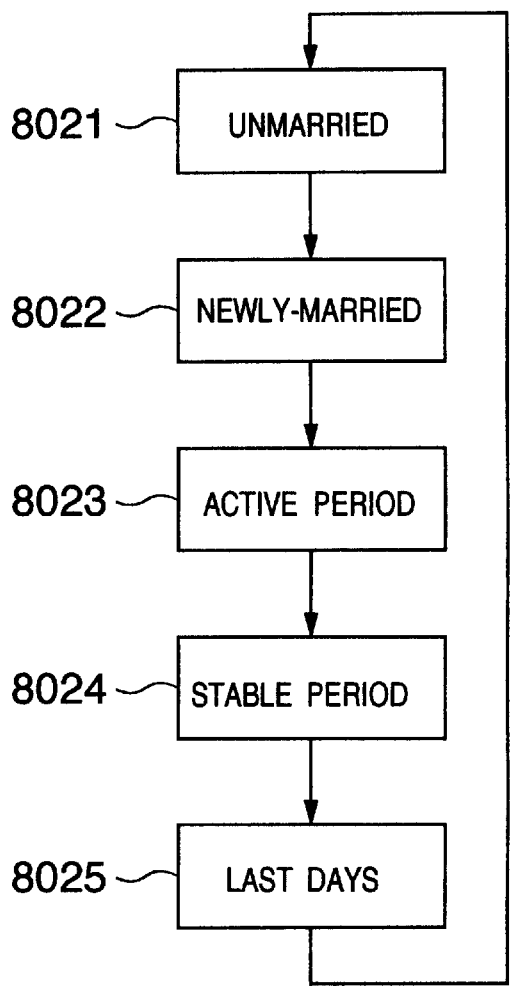
FIG. 8C
1. "UNMARRIED"
2. "NEWLY-MARRIED"
3. "ACTIVE PERIOD"
4. "STABLE PERIOD"
5. "LAST DAYS"

1. "CATEGORY OF BUSINESS"
2. "GUARANTOR"
3. "SUBJECT"
4. "FINANCING AMOUNT"

FIG. 12

| | | | | 10200 |
|---|---|---|---|---|
| 12010 | NUMBER OF HORIZONTAL AXIS TERMS | 2 | | |
| 12020 | NUMBER OF VERTICAL AXIS TERMS | 4 | | |
| 12030 | HORIZONTAL AXIS | TERM ID | TERM | 12032 |
| | | 1-1 | COMMENT | |
| | | 1-2 | CASE DOCUMENT | |
| 12040 | VERTICAL AXIS | TERM ID (12041) | TERM | 12042 |
| | | 2-1 | IMPACT LOAN | |
| | | 2-2 | APART LOAN | |
| | | 2-3 | FREE LOAN | |
| | | 2-4 | SPREAD LENDING | |

FIG. 13

| | | 10200 |
|---|---|---|
| 13010 — NUMBER OF TERMS | 5 | |
| 13020 — TOUR TYPE | LINE | |
| 13030 — TERM ID | TERM | — 13040 |
| 1 | UNMARRIED | |
| 2 | NEWLY-MARRIED | |
| 3 | ACTIVE PERIOD | |
| 4 | STABLE PERIOD | |
| 5 | LAST DAYS | |

FIG. 14

| | | | | |
|---|---|---|---|---|
| 14010 | NUMBER OF TERMS | 3 | | |
| 14020 | IMAGE FILE NAME | Map.img | | |
| 14030 | WIDTH | 640 | | |
| 14040 | HEIGHT | 480 | | |
| 14050 | TERM ID | TERM | COORDINATES (x,y) | 14070 |
| 14060 | 1 | A SHOP | 50,100 | |
| | 2 | B BUILDING FIRM | 450,50 | |
| | 3 | C COMPANY | 500,400 | |

| TERM ID (15110) | TERM (15120) | 15100 |
|---|---|---|
| 1 | CATEGORY OF BUSINESS |
| 2 | GUARANTOR |
| 3 | SUBJECT |
| ⋮ | ⋮ |

| LINK ID (15210) | LINK ORIGINATION TERM ID (15220) | LINK DESTINATION TERM ID (15230) | DIRECTION (15240) | 15200 |
|---|---|---|---|---|
| 1 | 1 | 7 | + |
| 2 | 7 | 2 | + |
| 3 | 2 | 5 | + |
| ⋮ | ⋮ | ⋮ | ⋮ |

FIG. 20
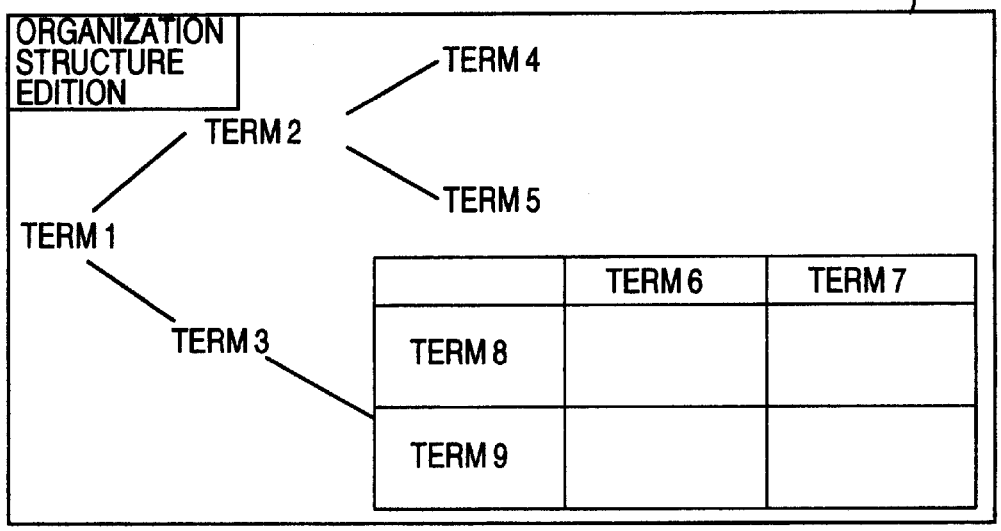
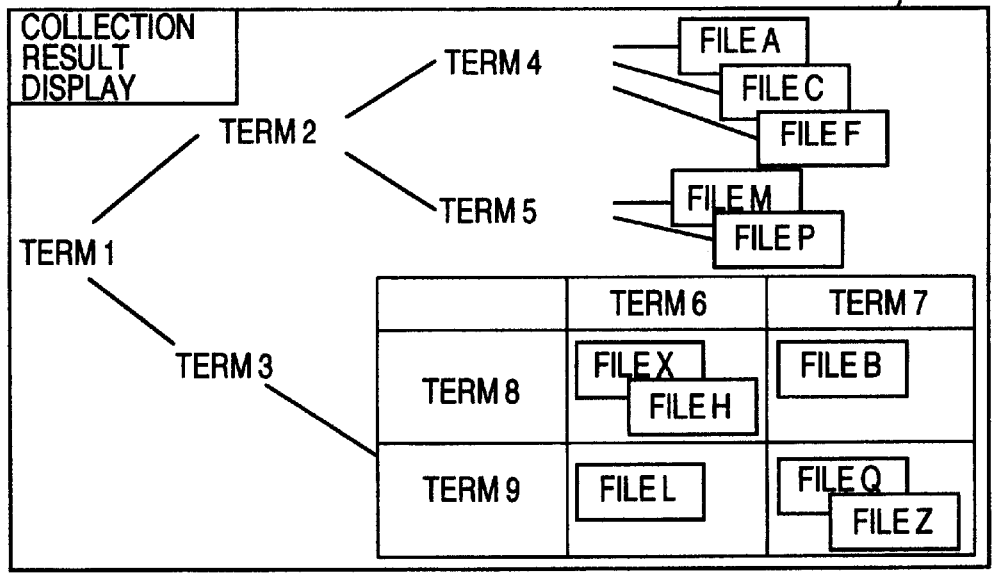

INFORMATION PRESENTATION APPARATUS AND INFORMATION PRESENTATION METHOD

BACKGROUND OF THE INVENTION

1. Field of the Invention

The present invention relates to an information presentation apparatus and an information presentation method and more particularly to the apparatus and the method which are arranged to search for data meeting a condition specified by a user among lots of data distributively located on a communications network and display the specified condition and the relevant data in a form of visually joining both with each other.

2. Description of the Related Art

There have been traditionally proposed many technologies of collecting and presenting information in an environment having many computers connected through a communications network. As a typical prior art, the JP-A8-212257 may be referred. This prior art is arranged to collect information pieces and edit the collected information pieces in any form so that the edited result may be easily referenced. In summary, this prior art is operated to create a virtual information sheet of paper, paste the collected information pieces on the information sheet, and present the result so that it may present the information pieces collectively for each topic.

However, the foregoing prior art has the following shortcoming. In this art, plural information pieces about one topic are pasted on one sheet. In a case that lots of information pieces concern with the same topic, the mutual relation among those information pieces is obscure. The information collection form is defined as one type of form in which the relevant information pieces are pasted on the information sheet. Hence, this information collection form disallows information pieces about one topic to be separated into those about some subtopics or be displayed in a multi-dimensional manner.

SUMMARY OF THE INVENTION

The present invention is made in consideration of the shortcoming the foregoing prior art involves. It is an object of the present invention to provide a method and an apparatus which are arranged so that a user who are anxious to collect information distributively located on a communications network may easily collect his or her target information pieces, arrange the collected information pieces in a form intended by the user, and present the arranged information pieces.

In carrying out the object, according to an aspect of the invention, an information presentation apparatus includes an information organization structure editing unit for being inputted with plural terms and a relation among the terms by a user and storing them as an information organization structure, a search condition creating unit for creating a search condition of information from the terms and the relation among those terms stored as the information organization structure, an information collecting unit for searching information storing means on the created search condition and collecting locational information of each data unit meeting the search condition, and a collection result joining unit for visually joining the terms and the relation among the terms stored as the information organization structure and the searched locational information of the data units when they are displayed.

The information collecting unit may operate to transmit the search condition to an information server through a communications network and receive the searched locational information of the data units from the information server.

BRIEF DESCRIPTION OF THE DRAWINGS

FIG. 6A is a view showing an example of a table type information organization element;

FIG. 6B is a view showing a search condition in the example shown in FIG. 6A;

FIGS. 8A and 8B are flowcharts showing an example of a tour type information organization element;

FIG. 8C is a view showing a search condition in the example shown in FIGS. 8A and 8B;

FIG. 12 is an explanatory view showing a data structure of a data portion of the table type information organization element;

FIG. 13 is an explanatory view showing a data structure of a data portion of the tour type information organization element;

FIG. 14 is an explanatory view showing a data structure of a data portion of the map type information organization element;

FIG. 15 is an explanatory view showing a data structure of a data portion of the hyper type information organization element;

FIG. 20 is an explanatory view showing a summary of processing of the present invention.

DESCRIPTION OF THE PREFERRED EMBODIMENTS

Hereafter, the description will be oriented to the embodiments of the present invention with reference to the appended drawings.

FIG. 20 is a view for illustrating how the information presentation apparatus according to the invention is used in a simplified manner. A numeral 20100 denotes a structure to be created and defined by a user. The user creates the combinational structure of a tree structure, a table structure and the like by entering plural terms and one or more relations among those terms into the information presentation apparatus. This structure is referred to as an information organization structure, which will be explained below. When the user triggers the search and collection after creating this structure, the operation is executed to automatically search the information located on the network, based on the structure created by the user and the terms included in the structure. A numeral 20200 denotes an image for displaying the information collected as a result of the search. On the image, in addition to the structure created and defined by the user, the name of each file in which the searched information is saved is displayed close to each term. This image thus clarifies the relation between the terms and the searched result.

Figure 1:
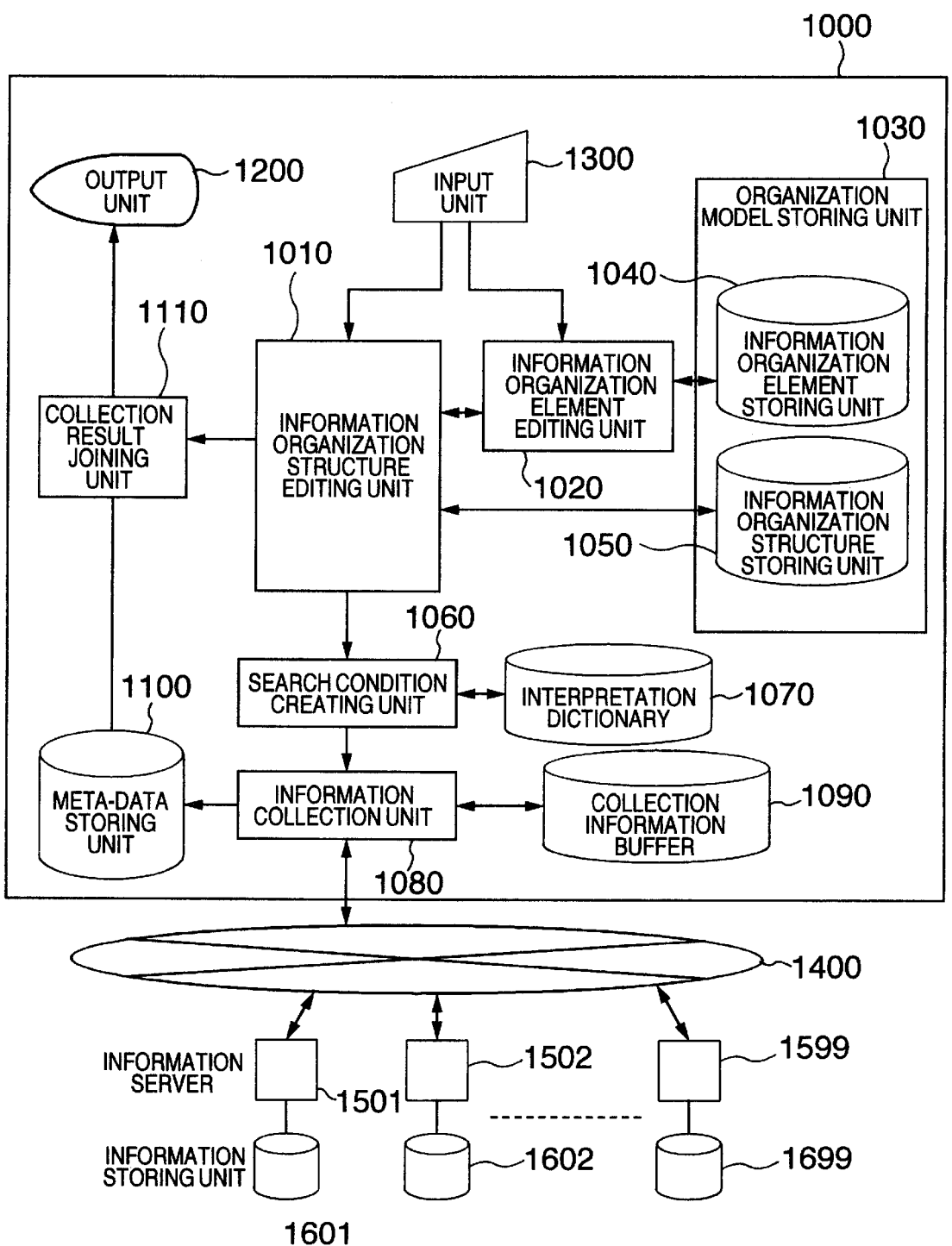
FIG. 1 is a diagram showing an overall arrangement of an information presentation apparatus according to an embodiment of the present invention.

Later, the description will be oriented to an embodiment of the present invention. FIG. 1 shows an overall configuration of this embodiment. A portion 1000 enclosed by a frame of FIG. 1 corresponds to an information presentation apparatus. As shown in FIG. 1, this apparatus 1000 is connected to a communications network 1400 when it is in use. The communications network includes information servers 1501 to 1599 connected therein. The servers 1501 to 1599 are computers equipped with information storing units 1601 to 1699, respectively. Those information storing units 1601 to 1699 store various kinds of information. Those kinds of information are stored in file type depending on an operating system running on each computer. Each file has a file name (file identifier). FIG. 1 shows three information servers 1501, 1502, 1599 as outside computers located on the communications network 1400. In actual, the number of the connected computers may be greater or smaller.

A numeral 1010 denotes an information organization structure editing unit. The editing unit 1010 is inputted with an input given by the user through the input unit 1300 and creates the information organization structure. The information organization structure is composed of one information organization element or a combination of plural information organization elements. The information organization element defines a structure for representing plural terms and a relation or a sequence of those terms and thereby represents the relation among information pieces. In other words, the information organization element represents how plural terms are related with one another. In this embodiment, five types of information organization elements may utilized. Concretely, they are a tree type, a table type, a tour type, a map type and a hyper type. A numeral 1020 denotes an information organization element editing unit. The editing unit 1020 is inputted with an input given by the user through the input unit 1300 and creates the information organization element of the input data.

A numeral 1030 denotes an organization model storing unit, which consists of an information organization element storing unit 1040 and an information organization structure storing unit 1050. The information organization element storing unit 1040 stores the information organization element created by the information organization element editing unit 1020. The editing unit 1020 operates to read the information organization element from the storing unit 1040 and utilize it when creating a new information organization element.

A numeral 1050 denotes an information organization structure storing unit, which stores the information organization structure created by the editing unit 1010. The editing unit 1010 operates to read the information organization structure from the information organization structure storing unit 1050 and utilize it when creating a new information organization structure.

A numeral 1060 denotes a search condition creating unit, which operates to read the information organization structure created by the editing unit 1010 and create plural search conditions. The search condition creating unit 1060 operates to obtain one or more related terms with one term by consulting an interpretation dictionary. The search condition is created as a combination of AND and OR of plural terms.

A numeral 1080 denotes an information collecting unit, which operates to pick out the search conditions created by the search condition creating unit 1060 one by one and search an information piece stored in the computer connected to the communications network 1400, based on the search condition. In search, a collected information buffer 1090 may be used as a working area. The meta data for representing a location of the information piece for meeting the search condition is stored in a meta data storing unit 1100.

A numeral 1110 denotes a collection result joining unit, which operates to join the information organization structure created by the editing unit 1010 with the information collection result stored in the meta data storing unit 1100 for creating a display image and displaying it on an output unit 1200. Before obtaining the information collection result, only the information organization structure is displayed.

The information presentation apparatus 1000 is composed of a computer such as a workstation or a personal computer equipped with a communications interface. The storing unit, the buffer, and the dictionary included in the apparatus 1000 are implemented by a storing unit of the computer and the remaining portion of the apparatus 1000 is implemented by a program executed by the CPU of the computer.

The communications network 1400 is a general-purpose communications network such as a LAN (Local Area Network) or an Internet.

The information servers 1501 to 1599 are computers including workstations and personal computers, each of which is equipped with the communications interface. Further, they may be a DBMS (DataBase Management System).

Figure 2:
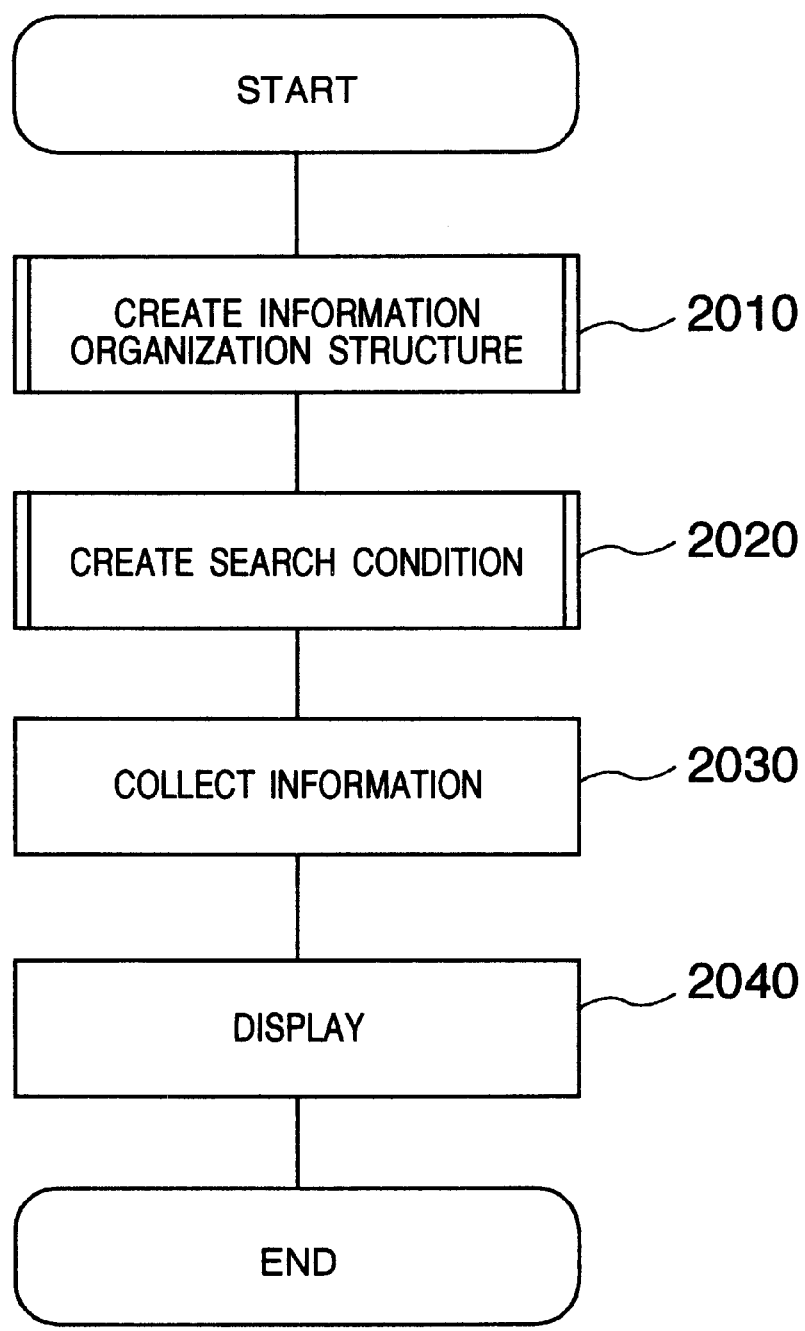
FIG. 2 is a flowchart showing a main process executed in the information presentation apparatus shown in FIG. 1.

FIG. 2 shows a main flow of the processing executed in the information presentation apparatus 1000 according to this embodiment of the invention. At a step 2010, the information organization structure is created. At a step 2020, the search conditions are generated. At a step 2030, information is collected. At a step 2040, the collection result is displayed together with the information organization structure.

At these steps, the below-described processing is executed. At first, refer to FIG. 3, which shows a processing flow of a subroutine of creating the information organization structure at the step 2010. This processing flow corresponds to the information organization structure editing unit 1010 shown in FIG. 1. At a step 3010, a branch process is executed to determine whether or not the created information organization structure is read from the information organization structure storing unit 1050. If the user would like to create a new information organization structure, the user selects "No" and then goes to a step 3030. On the other hand, if the user would like to create a new information organization structure by using the previously created structure, the user selects "Yes" and then goes to a step 3020. At the step 3020, the operation is executed to read the previously created information organization structure from the information organization structure storing unit 1050. At the step 3030, the operation is executed to create the information organization element. At a step 3040, another branch process is executed to determine whether or not another information organization element is created. At a step 3050, the information organization elements are combined for completing the information organization structure and then the combination is put into the information organization structure storing unit 1050.

Figure 4:
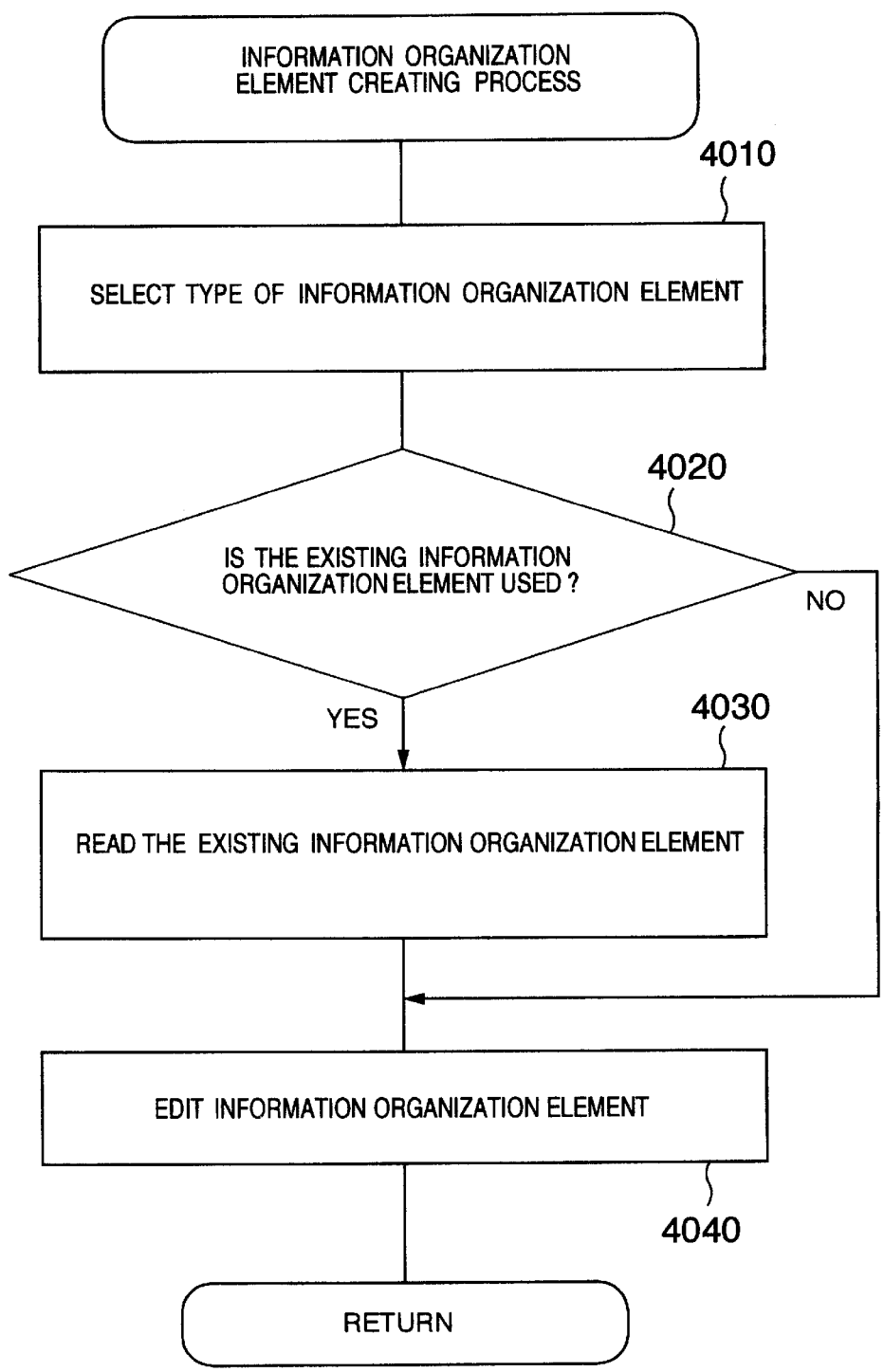
FIG. 4 is a flowchart showing a subroutine of a process of creating an information organization element.

FIG. 4 shows a processing flow of a subroutine (step 3030) for creating the information organization element. This processing flow corresponds to the operation of the information organization element editing unit 1020 shown in FIG. 1. At a step 4010, the user selects a type of the information organization element to be created. At a next step 4020, a branch process is executed to determine whether or not the existing information organization element is read from the information organization element storing unit 1040. If the user would like to create a new information organization element, the user selects "No" and then goes to a step 4040. On the other hand, if the user would like to create an information organization element by using the previously created organization element, the user selects "Yes" and then goes to a step 4030. At the step 4030, the user selects the existing information organization element he or she want to read and the selected information organization element is read from the information organization element storing unit 1040. At a step 4040, the operation is executed to edit the information organization element for completing it and then put it into the information organization element storing unit 1040.

Figure 3:
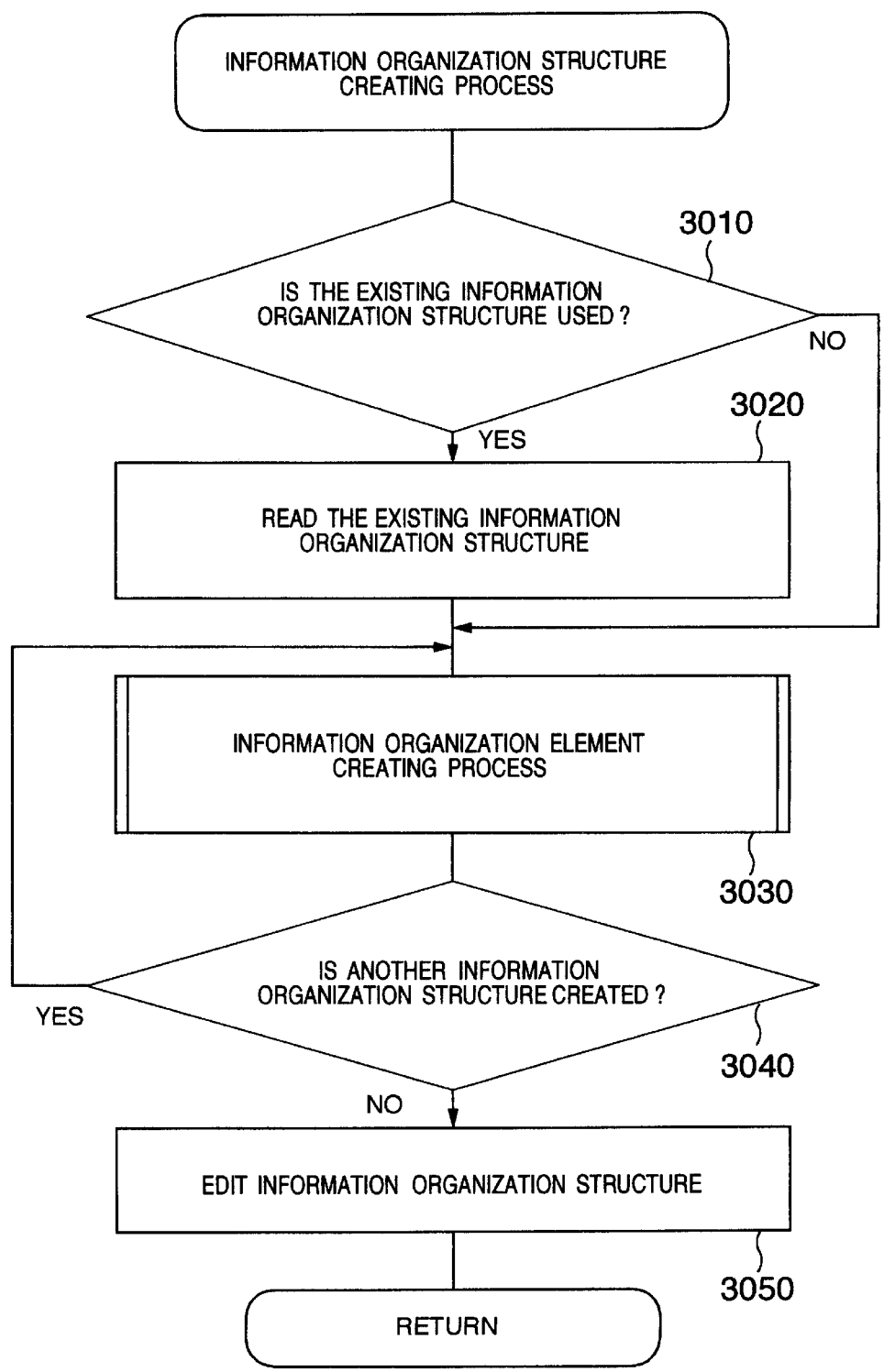
FIG. 3 is a flowchart showing a subroutine of a process of creating an information organization structure.

The process of creating the information organization structure shown in FIG. 3 and the process of creating the information organization element shown in FIG. 4 are executed to prompt the user to select on a GUI (Graphic User Interface) the options such as a type through the input unit 1300. Further, those processes also prompt the user to interactively enter the information organization element and the information organization structure by using the graphics and the characters as shown in FIGS. 5A, 6A, 7A, 8A, 8B, 9A, and 16 (to be described below). The creating process creates the data structure shown in FIGS. 10 to 15 and 17 (to be discussed below) from the inputted graphics and characters.

This embodiment utilizes as the type of the information organization element five kinds of types, that is, a tree type, a table type, a tour type, a map type, and a hyper type. In turn, the description will be oriented to these five types of information organization elements.

Figures 5A, 5B:
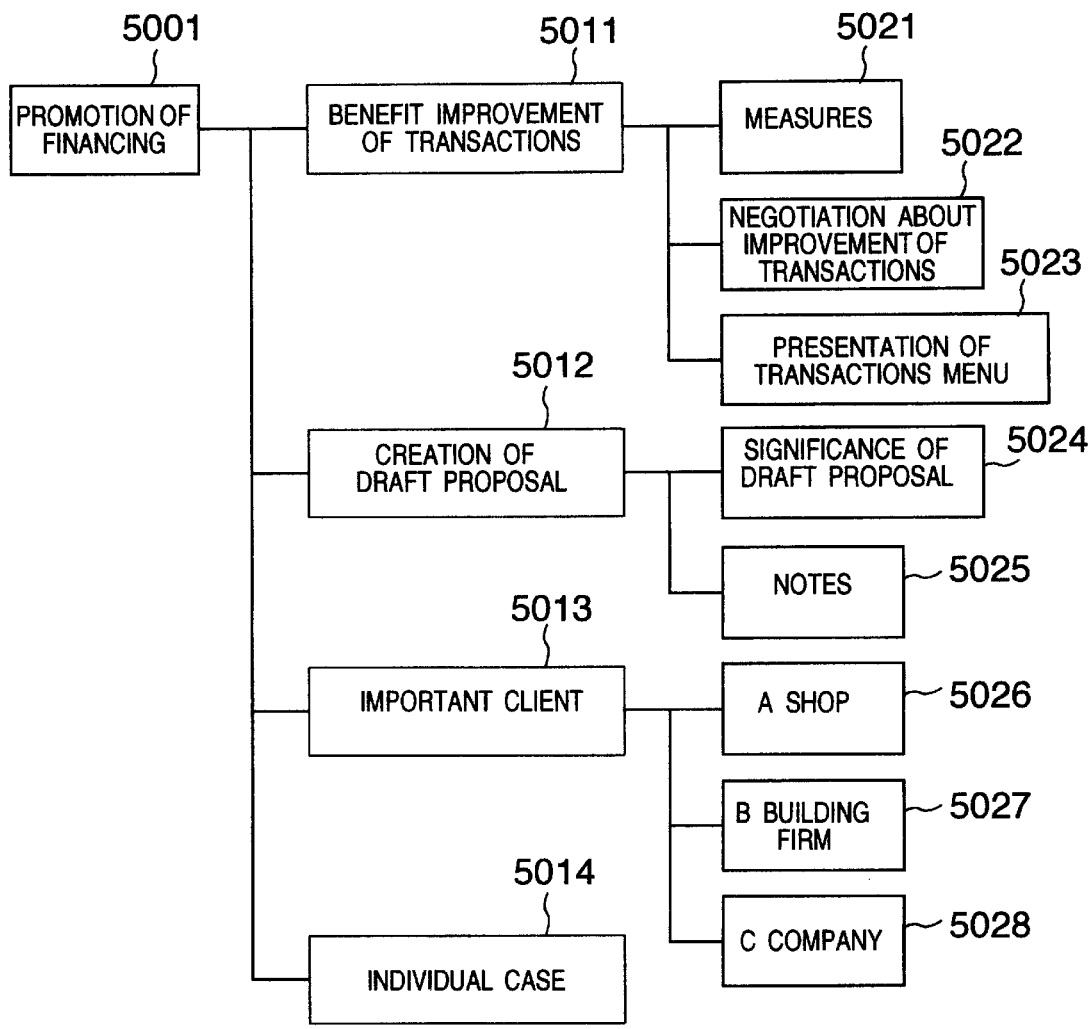
FIG. 5A is a view showing an example of a tree type information organization element.
FIG. 5B is a view showing a search condition in the example shown in FIG. 5A.

FIG. 5A illustrates one example of a tree type information organization element. The tree type information organization element includes one root term and several child terms subordinate to the root term. Each child term may also have one or more child terms, each of which may further have one or more child terms, each of which may have the same, and so forth. This organization element presents an overall tree structure (hierarchy structure). The term having no child, that is, the term located at the tip (corresponding to the leaf of the tree structure) is an information collection unit. The information collection unit is one search unit. In the example shown in FIG. 5A, numerals 5001 to 5028 indicate the terms (in which the numeral 5001 denotes a root term). Numerals 5021 to 5028 denote leaf terms, each of which is the information collection unit.

FIG. 6A illustrates one example of a table type information organization element. The table type information organization element has a table structure, in which the vertical axis terms are defined in the leftmost column and the horizontal axis terms are defined in the top row. An empty cell corresponds to the information collection unit. In the example shown in FIG. 6A, numerals 6011 and 6012 denote horizontal axis terms and numerals 6021 to 6024 denote vertical axis terms. Hence, the total number of the information collection units is eight.

Figures 7A, 7B:
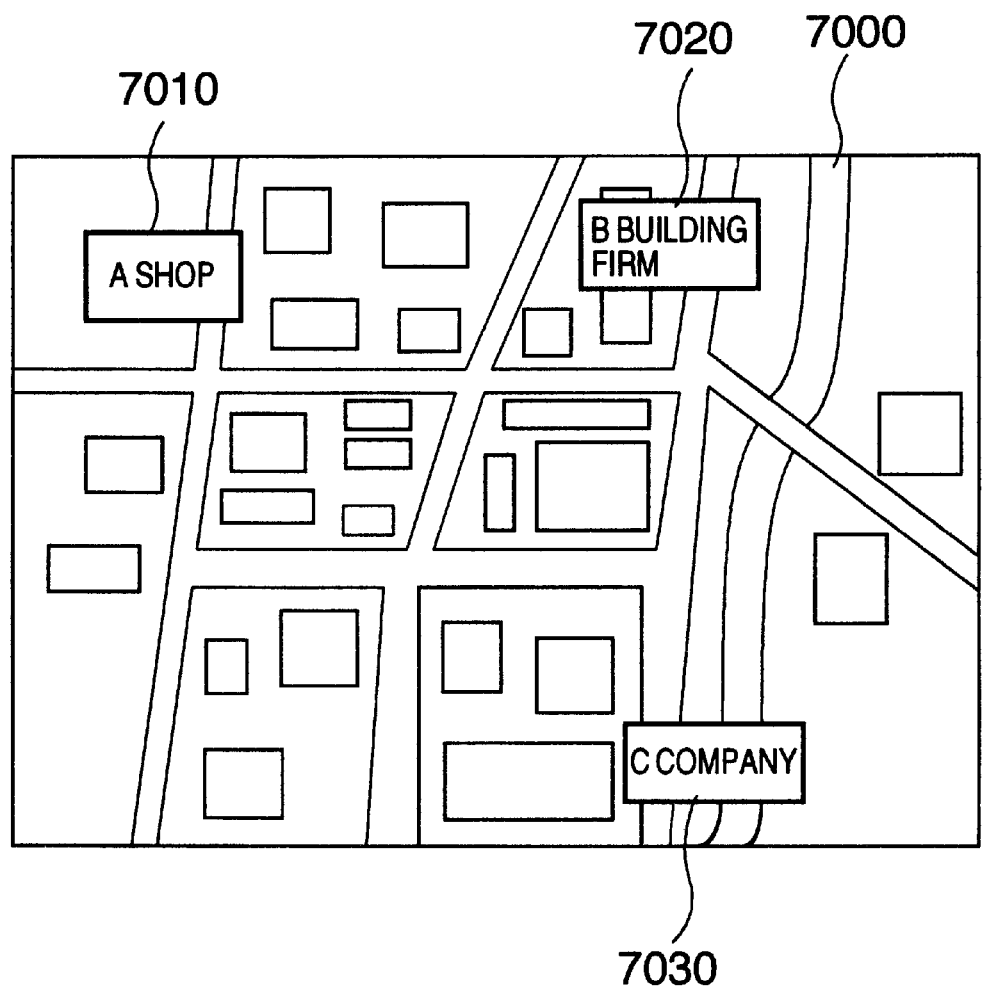
FIG. 7A is a view showing an example of a map type information organization element.
FIG. 7B is a view showing a search condition in the example shown in FIG. 7A.

FIG. 7A illustrates one example of a map type information organization element. It is an overall rectangular picture image on which a location is specified for determining each term. Each term is the information collection unit. In the example shown in FIG. 7, a numeral 7000 denotes a picture image (map image). Numerals 7010 to 7030 denote terms, each of which corresponds to the information collection unit.

FIGS. 8A and 8B illustrate two examples of a tour type information organization element. The tour type information organization element is characterized to have some kind of sequence (for example, a temporal sequence). As shown in FIG. 8A, the tour type information organization element may have a start-point term and an end-point term, while as shown in FIG. 8B, it may be arranged to have a start-point term and an end-point term but be circulated from the end point to the start point. The user may select either one. Hereafter, the form shown in FIG. 8A is called the line form and the form shown in FIG. 8B is called the round form. The tour type information organization element defines plural terms in a specified sequence, each term of which corresponds to the information collection unit. In the examples shown in FIGS. 8A and 8B, numerals 8011 to 8025 denote terms, which are the information collection units.

Figures 9A, 9B:
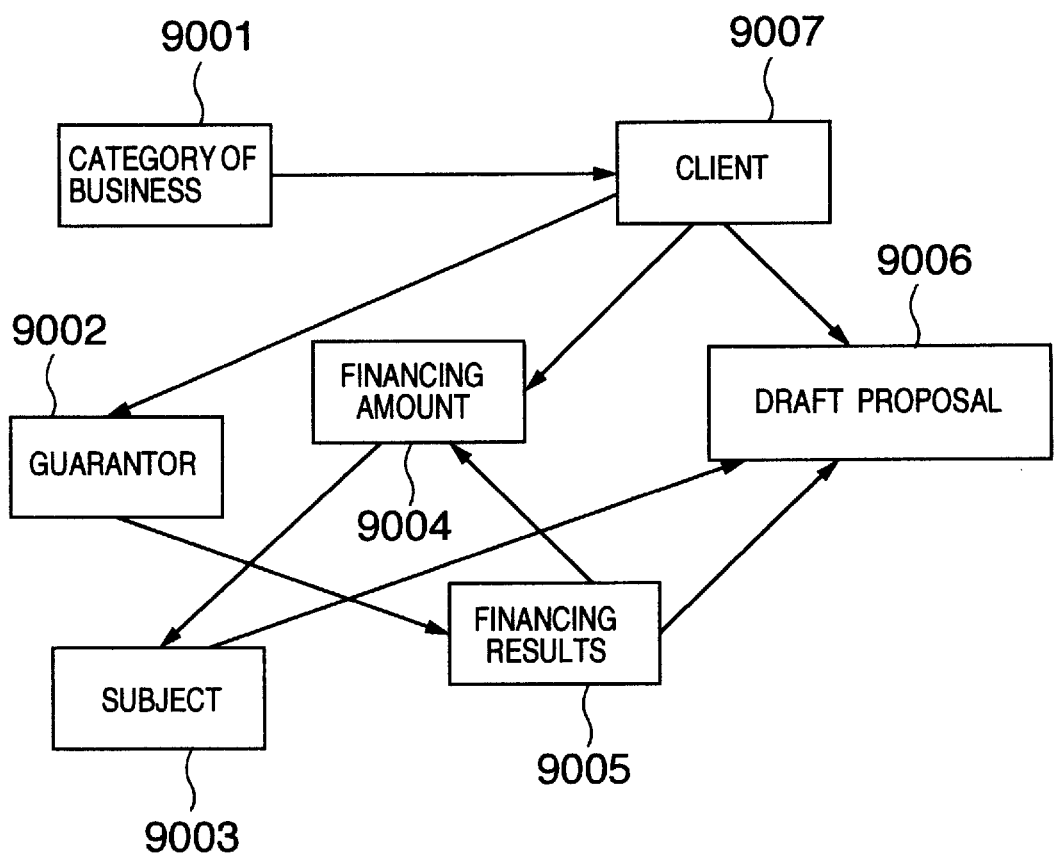
FIG. 9A is a view showing an example of a hyper type information organization element.
FIG. 9B is a view showing a search condition in the example shown in FIG. 9A.

FIG. 9A illustrates one example of a hyper type information organization element. Each term of the hyper type information organization element may be joined with another term in a certain direction. Each term is the information collection unit. In the example shown in FIG. 9A, numerals 9001 to 9007 denote the terms.

Figure 10:
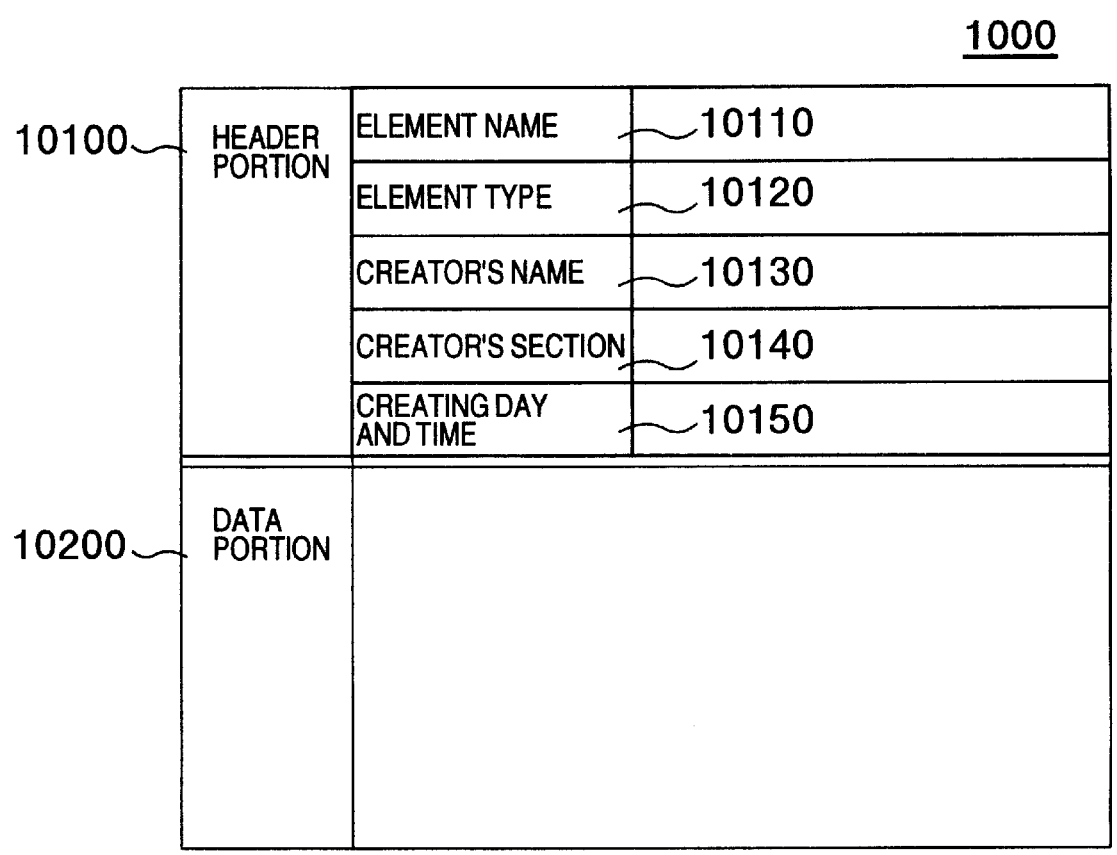
FIG. 10 is an explanatory view showing a data structure of the information organization element.

FIG. 10 shows a data structure of the information organization element described with reference to FIGS. 5 to 9. The information organization element 10000 consists of a header portion 10100 and a data portion 10200. The header portion 10100 stores an element name (or an element identifier) 10110, an element type 10120, a creater's name 10130, a creater's section 10140, and a creating day and time 10150. The data structure of the data portion 10200 depends on the element type. If the information organization element is stored in the information organization element storing unit 1040 and then is used later, the element name 10110 is read and used as an ID (Identifier). The information organization element may be stored in the information organization element storing unit 1040 together with various kinds of information related with the element such as the creater's name, the creater's section and the creating day and time. The accessory data is quite convenient, because it may be referred when the element is read and used again.

Figure 11:
FIG. 11 is an explanatory view showing a data structure of a data portion of the tree type organization element.

FIG. 11 shows the data structure of the data portion 10200 included in the tree type information organization element.

The information for one term is indicated as one row. The data of one term consists of a term ID (identifier) 11010, a term 11020, a parent term ID 11030, a number of child terms 11040, and child term IDs 11050. The root term has no parent, so that the corresponding parent term has a null value in the ID column. The exemplary data shown in FIG. 11 corresponds to the data portion 10200 included in the tree type information organization element shown in FIG. 5A.

FIG. 12 shows the data structure of the data portion 10200 included in the table type information organization element. The data consists of a number of horizontal axis terms 12010, a number of vertical axis terms 12020, data 12030 of the terms composing the horizontal axis, and data 12040 of the terms composing the vertical axis. The data 12030 of the terms consists of term IDs 12031 and terms 12032. The data 12040 of the terms consists of term IDs 12041 and terms 12042. As the term IDs 12031 "1-1" and "1-2" are shown, in which "1-" indicates the horizontal axis term. Likewise, the number "2-" of the term ID 12041 indicates the vertical axis term. The data shown in FIG. 12 corresponds to the data portion 10200 included in the table type information organization element shown in FIG. 6A.

FIG. 13 shows the data structure of the data portion 10200 included in the tour type information organization element. The data portion consists of a number of terms 13010, a tour form 13020, and data about terms. The line form or the round form is entered into the tour form row 13020. The data about terms consists of term IDs 13030 and terms 13040. The sequence of the term IDs represents the sequence of the terms (sequence indicated by an arrow of FIG. 8). The exemplary data shown in FIG. 13 corresponds to the data portion 10200 included in the tour type information organization element shown in FIG. 8A.

FIG. 14 shows the data structure of the data portion 10200 included in the map type information organization element. The data consists of a number of terms 14010, a file name of a picture image 14020, a horizontal pixel number of the picture image 14030, a vertical pixel number of the picture image 14040, and data about each term. The data about each term consists of a term ID 14050, a term 14060 and a two-dimensional coordinates 14070. The exemplary data shown in FIG. 14 corresponds to the data portion 10200 included in the map type information organization element shown in FIG. 7A.

FIG. 15 shows the data structure of the data portion 10200 included in the hyper type information organization element. The data portion 10200 consists of a term data 15100 and a link data 15200. The term data 15100 stores a number of terms (not shown) and data of each term. The data of each term consists of a term ID 15110 and a term 15120. The link data 15200 stores the data of the link between the terms. The data of each link consists of a link ID 15210, a link origination term ID 15220, a link destination term ID 15230, and a link direction 15240. The link direction 14240 may be inputted with any one of +, − and ±, which represent a forward direction (from the origination term to the destination term), a backward direction (from the destination term to the origination term), and a bi-direction, respectively. The exemplary data shown in FIG. 15 corresponds to the data portion 10200 included in the exemplary hyper type information organization element shown in FIG. 9A.

Figure 16:
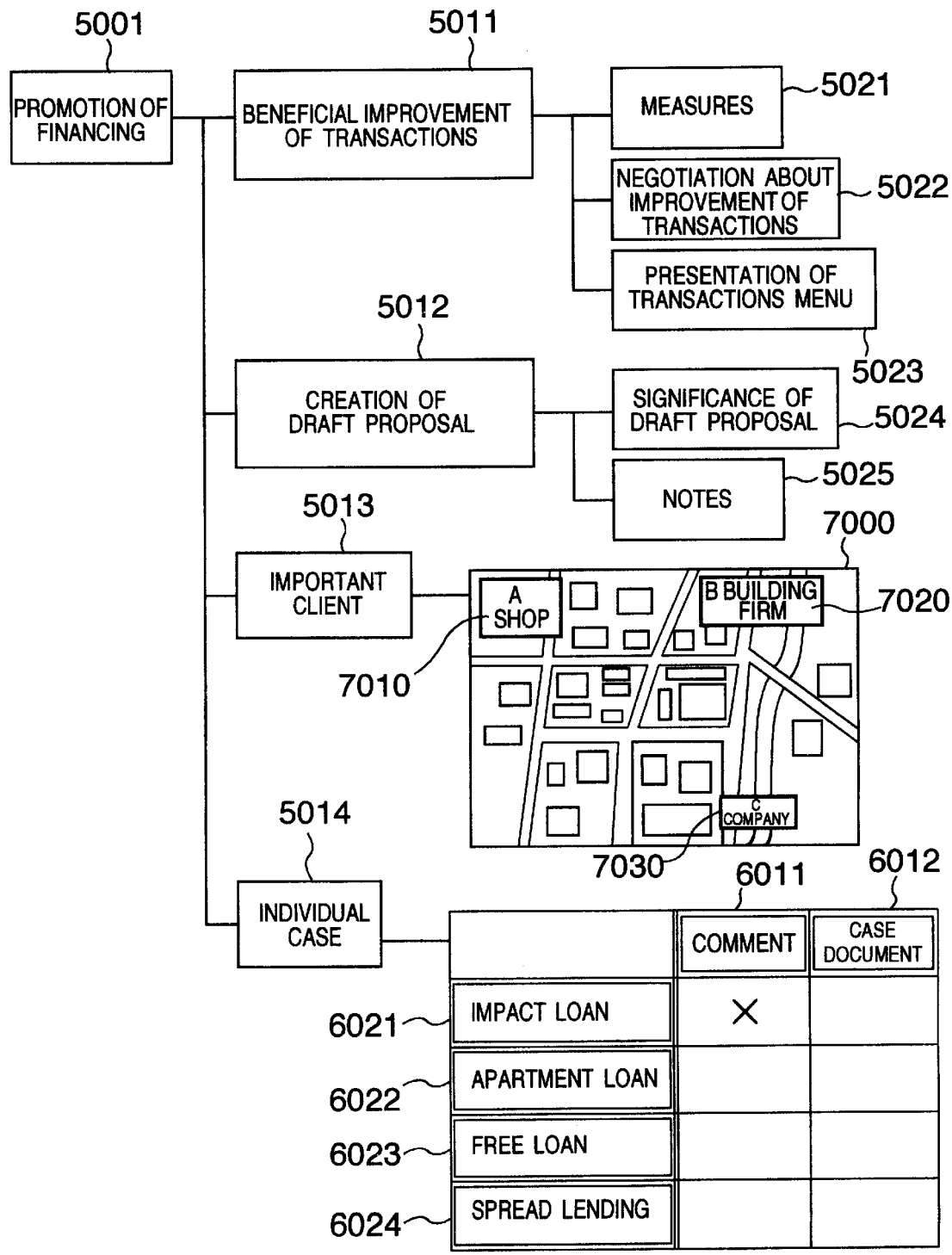
FIG. 16 is a view showing an example of the information organization structure composed of the combination of plural information organization elements.

The information organization structure is composed of a combination of one or more information organization elements. The combination is realized by the nesting system, so that one information organization element may be inputted into one term section included in the information organization element. FIG. 16 shows the exemplary information organization structure arranged by combining plural information organization elements with each other. This exemplary structure is arranged so that the map type information organization element shown in FIG. 7A is entered into the term 5013 of the tree type information organization element shown in FIG. 5 and the table type information organization element shown in FIG. 6A is entered into the term 5014 thereof.

Figure 17:
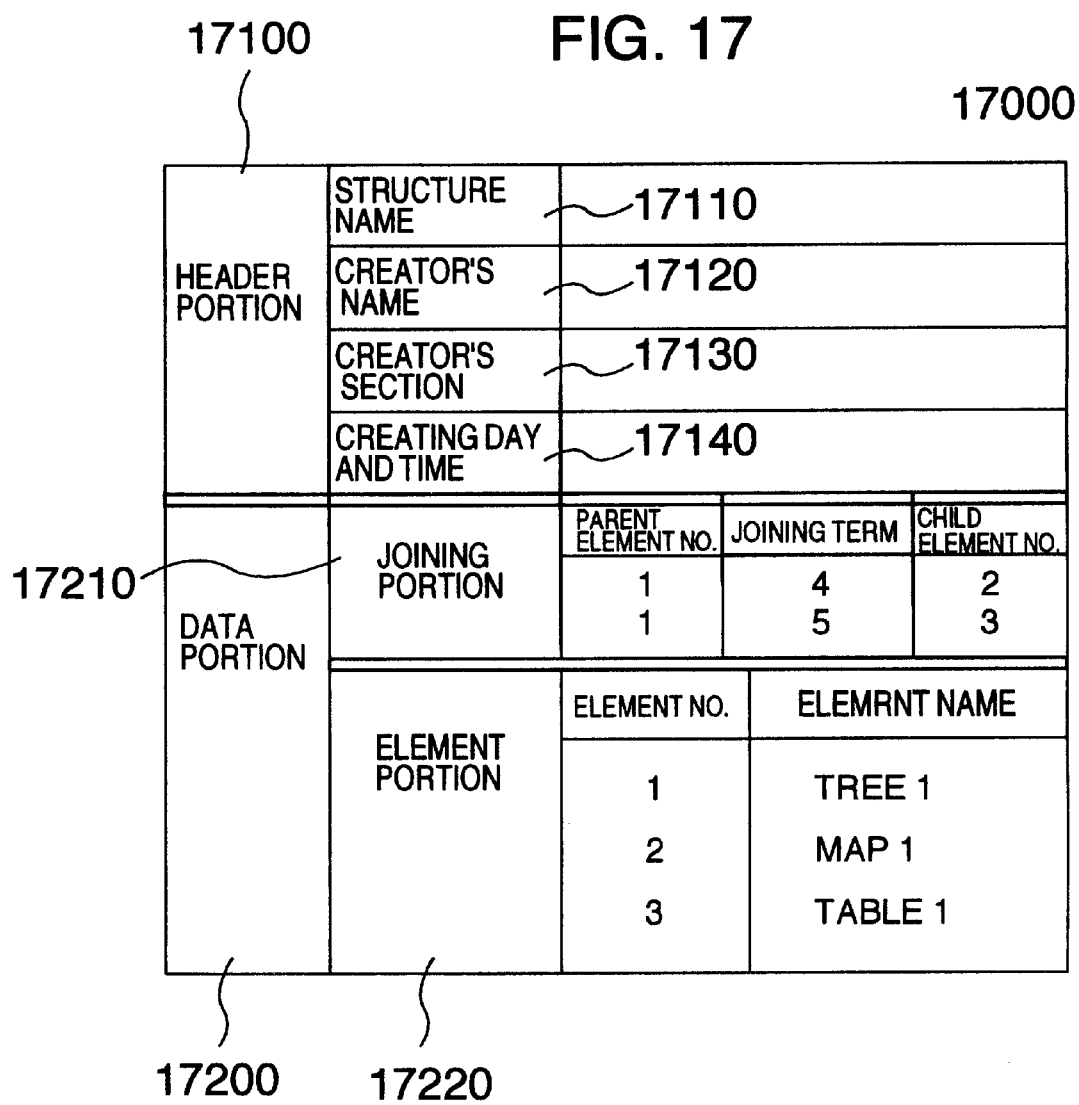
FIG. 17 is an explanatory view showing a data structure of the information organization structure.

FIG. 17 shows the data structure of the information organization structure shown in FIG. 16. The data of the structure consists of a header portion 17100 and a data portion 17200. The header portion 17100 stores an information organization structure name 17110, a creator's name 17120, a creator's section 17130, and a creating day and time 17140. When the information organization structure is stored in the information organization structure storing unit 1050 for a later use, the information organization structure name 17110 is read and used as an ID. In addition, the information organization structure may be stored in the information organization structure storing unit 1050 together with various kinds of accessory information related with the structure such as the creator's name, the creator's section, and the creating day and time. These pieces of accessory information may be referred when the structure may be read for a later use.

The information of the data portion 17200 consists of a joining portion 17210 and an element portion 17220. The element portion 17220 is inputted with the data of each of the information organization elements composing the information organization structure. The data to be inputted into the element portion 17220 consists of a combination of an element NO. and an element name. The element NO. (Number) is used for specifying each of the information organization elements composing the information organization structure. The element NO. is a unique number in this information organization structure. The element name is set with the information organization element name corresponding to each element NO. The element name is a name of the information organization element described with reference to FIGS. 5 to 10. The joining portion 17210 is inputted with the joining information for representing how the information organization elements are combined with each other. One piece of joining information consists of a combination of a parent element NO., a joining term ID and a child element NO. For example, if the parent element NO. is "1", the joining term ID is "4", and the child element is "2" in the joining data, it indicates that the element NO. "2" is joined in the term of ID "4" included in the element of NO. "1".

FIG. 17 shows the data structure of the information organization structure shown in FIG. 16. Hence, the name TREE 1 of the data structure of the tree type information organization element shown in FIG. 5 is set to the name of the element NO.1. The name MAP 1 of the data structure of the map type information organization element shown in FIG. 7 is set to the name of the element NO.2. Further, the name TABLE1 of the data structure of the table type information organization element shown in FIG. 6 is set to the name of the element NO.3.

Figure 18:
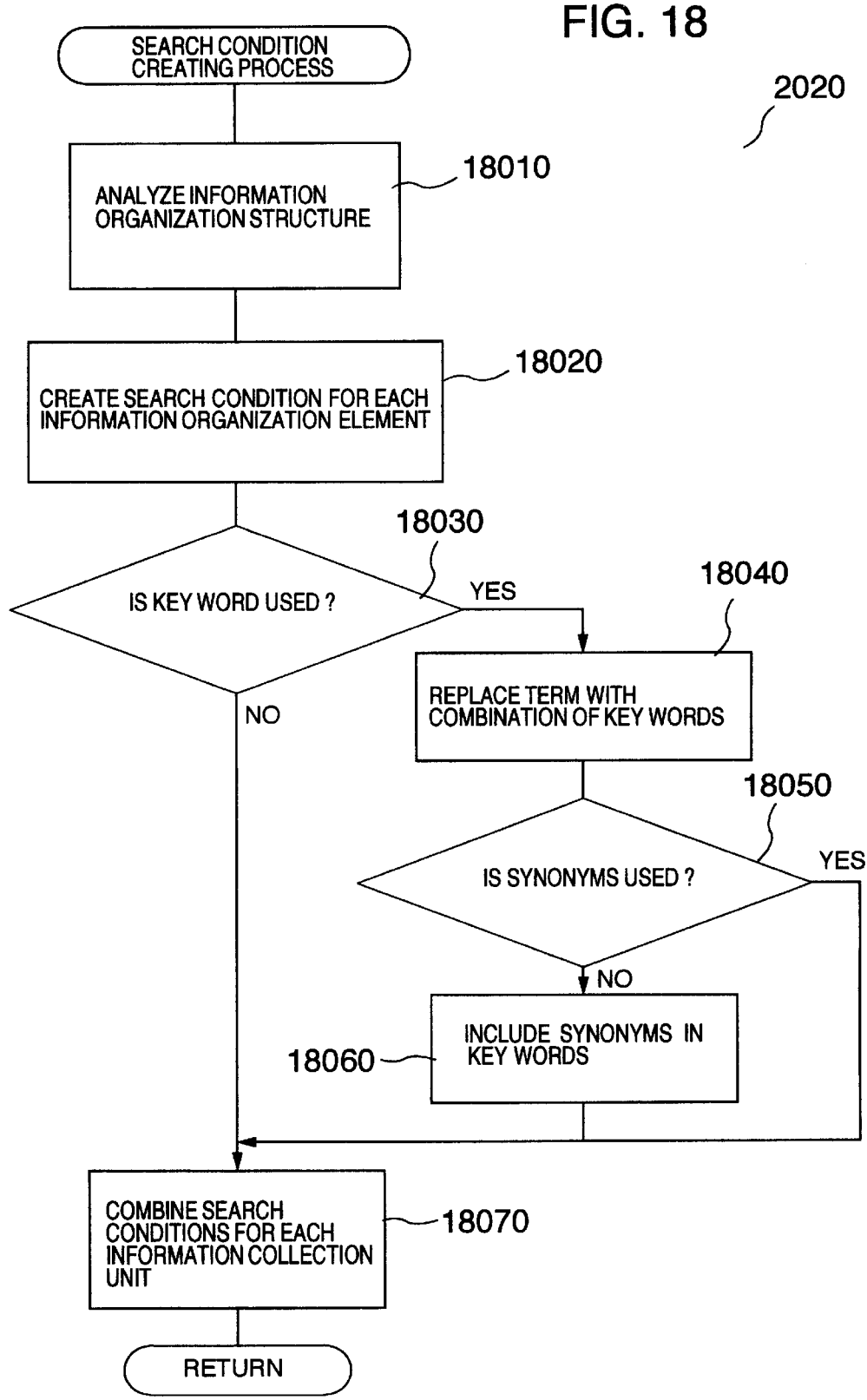
FIG. 18 is a flowchart showing a subroutine of a process of creating the search condition.

The description will be turned to the processing flow. FIG. 18 shows a processing flow of a subroutine of creating a search condition (step 2020 shown in FIG. 2), which corresponds to the search condition creating unit 1060 shown in FIG. 1. At a step 18010, the operation is executed to analyze the created information organization structure for extracting a type of each of the information organization elements included in the structure and data about each term included in the element. At a step 18020, the operation is executed to create a search condition for each information organization element. The search condition is created by pulling out the terms contained in the information organization element and combining the terms through the effect of the AND and the OR operations.

This operation will be concretely described below. The search condition created from each information organization element is shown in FIG. 5B, 6B, 7B, 8C or 9B. These are the basic conditions. The user may select the following modifications of those search conditions when starting the process of creating the search condition. The first modification is a method of extracting one or more key words from the terms included in the information organization element and setting them to the search condition (steps 18030 and 18040). In the example shown in FIG. 5B, the search condition includes "promotion of financing" and "benefit improvement of transactions". However, they may be replaced with {"financing" AND "promotion"} and {"benefit" AND "transaction" AND "improvement"}.

The second modification is a method of pulling out key words from the terms included in the information organization element and synonyms of each keyword from the interpretation dictionary 1070 and setting them to be included in the search condition (steps 18050 and 18060). The synonyms of "financing" are "loan" and "lending". Hence, the key word "financing" may be replaced with {"financing" OR "loan" OR "lending"}. The interpretation dictionary 1070 contains the words arranged in alphabetical order. Each word and a pointer to its synonyms are stored as one entry in the dictionary. Apparently, this dictionary is created beforehand.

The information organization structure is a combination of the information organization elements. Hence, if the information collection unit belongs to two or more information organization elements, the search condition created from one information organization element is joined with that created from another information organization element through the effect of the AND operation. Considering a mark X shown in FIG. 16, {"promotion of financing" .AND. "individual case"} of the tree type portion is joined with {"impact loan" .AND. "comments"} of the table type portion. The resulting search condition is made to be {"promotion of financing" .AND. "individual case " .AND. "impact loan" .AND. "comments"} (step 18070).

As described above, the search condition is created for each information collection unit.

Turning to FIG. 2, at the step 2030, the operation is executed to collect information pieces, which corresponds to the information collection unit 1080 shown in FIG. 1. In collecting information, the information is searched in the search condition created at the step 2020 so that the result may be obtained for each information collection unit.

All the information servers or the specified servers connected in the network 1400 may be searched. These servers to be searched may be specified by the user before starting the information collection. The information collection unit 1080 of the information presentation apparatus 1000 operates to transmit the search condition for each information collection unit to all the information servers to be searched through the network 1400.

Of the information servers having received the search conditions, the server provided with the search function operates to convert the search condition into any suitable form (such as SQL) for the server itself and then search its information storing unit. The type of data to be searched depends on the server. In general, the data may be a text file, a document file or a database. The server operates to transmit a name of the data file meeting the search condition to the information presentation apparatus 1000.

The information collection unit 1080 of the information presentation apparatus 1000 operates to store in the meta data storing unit 1100 the name of the file transmitted thereto and the name of the server having transmitted it as the meta data in the state that the file name and the server name are linked with the information collection unit. If the server uses the hierarchical file system like Unix or Windows, the file name includes a path from a root.

Of the information servers having received the search conditions, the server providing no search function operates to notify the information presentation apparatus of the absence of the search function. Then, the information server operates to read the data from the information storing unit connected thereto and then transmit it to the information presentation apparatus 1000. The information collection unit 1080 in the apparatus 1000 having received the data operates to temporarily store the data in the information collection buffer 1090. Then, the information accumulated in the information collection buffer 1090 is searched under the search condition. About the hit information, the file name and the server name from which it was read are stored as the meta data in the meta data storing unit 1100 in the state that the file name and the server name are linked with the information collection unit.

The foregoing steps are repeated for all the information collection unit.

The communications between the information presentation apparatus 1000 and the information server are executed on the protocol depending on the network 1400.

For example, the protocol is TCP/IP.

Figure 19:
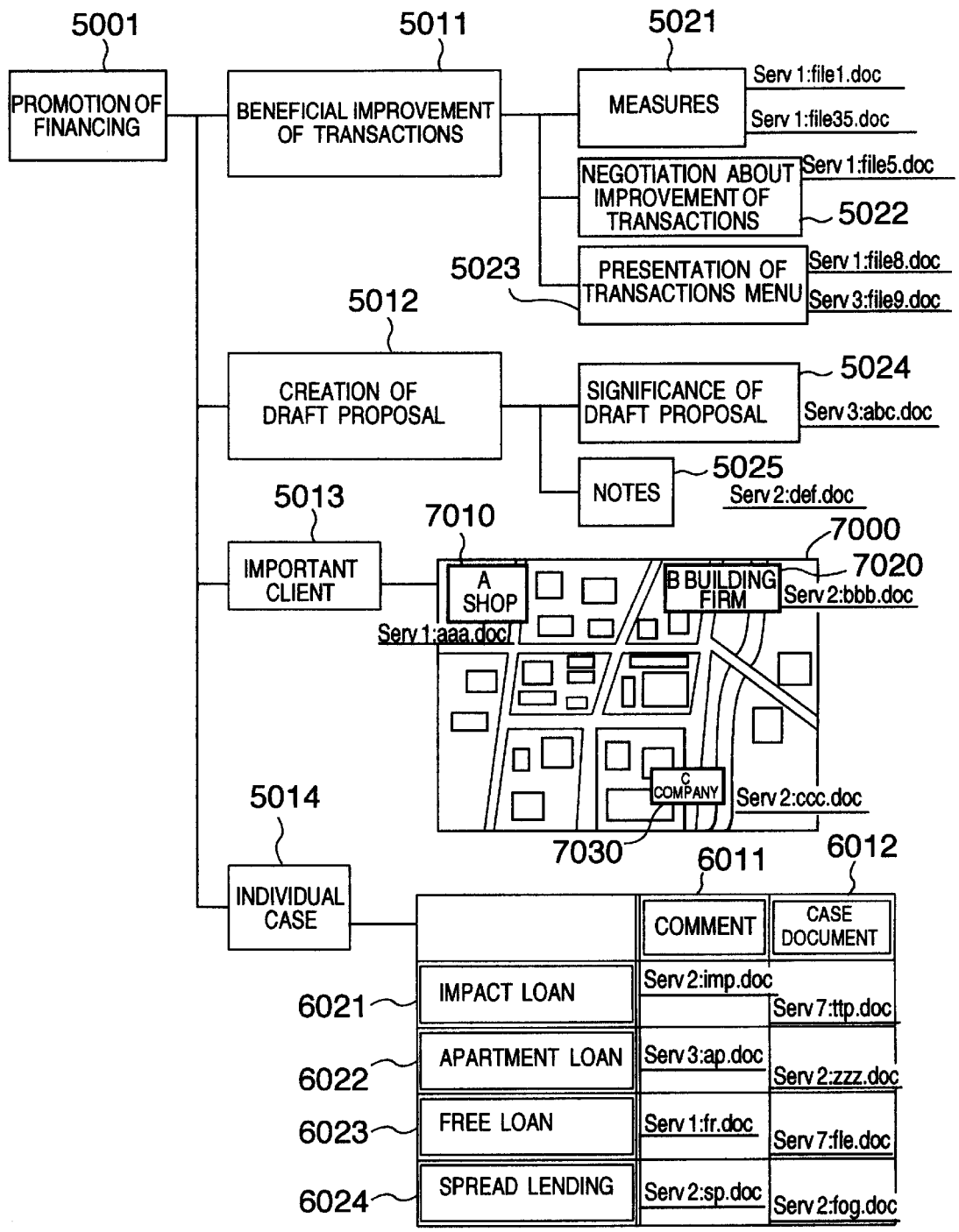
FIG. 19 is a view showing an example of displaying the collection result.

At the step 2040, the result is displayed. At this step, the collection result joining unit 1110 operates to read the information organization structure created before the information collection process from the information organization structure editing unit 1010. Then, the unit 1110 operates to read the collection result for each information collection unit from the meta data storing unit 1100. The meta data of the collection result is located closer to each information collection unit of information organization structure for generating the image to be displayed. The generated image is displayed on the output device 1200 as the result. FIG. 19 shows an example of the display result. As shown, the meta data (the name of the file and the information server where the file is stored) of the collection result is displayed for each collection unit of the information organization structure. In addition, the apparatus may be arranged to display the meta data by clicking the graphic portion with a mouse. By clicking the displayed meta data with a mouse, a URL (Uniform Resource Locator) is created from the meta data so that the direct access may be made to the file through the network.

According to the foregoing embodiment, the information organization structure is created by combining plural information organization elements. In place, for example, the tree structure itself as shown in FIG. 5A may be made to be the information organization structure. Or, the table structure itself as shown in FIG. 6A is made to be the information organization structure. That is, one information organization element itself may be utilized as the information organization structure.

Further, the foregoing embodiment has described the arrangement where the data to be searched are distributed on the communications network. The data may be located inside the information presentation apparatus, in which case the process of transmitting the search condition and receiving the searched result may be elided.

What is claimed is:

1. An information presentation apparatus for presenting information in accordance with a search condition that corresponds to an information collection unit for collecting information, comprising:

information organization structure editing means for storing an information organization structure indicating a relation between terms in a first one of a plurality of search conditions and terms in a second one of the plurality of search conditions;

search condition creating means for accepting input of a plurality of terms constituting the search condition and creating the plurality of search conditions based on the plurality of input terms and the stored information organization structure;

information collecting means for searching information storing means by using said created search conditions and collecting information corresponding to the plurality of search conditions, wherein said information organization structure is composed of information organization elements served as sub units and said information organization structure editing means prompts a user to enter plural terms and one or more relations among said terms, stores them as the information organization elements, prompts a user to enter one or more relations among said information organization elements, and store said relations as an information organization structure, wherein said information organization element may take any type of a tree type having the terms located in a tree structure, a table type having the terms located in the items of a table structure, a map type having the terms located in a given picture, a tour type having the terms defined in a certain order, and a hyper type arranged to connect between any two terms by an arrow, wherein said search condition creating means creates at each leaf a search condition by joining the terms from a root one to a leaf one through the effect of the AND operation, for the tree type information organization element, creates at each cell a search condition by joining the vertical item with the horizontal item through the effect of the AND operation, for the table type information organization element, and creates at each term a search condition by the term itself, for the map type, the tour type and the hyper type information organization elements.

2. The information presentation apparatus as claimed in claim 1, wherein said information collection means operates to transmit the search condition to each of computers provided with information storing means distributively located on a communications network and collect the information corresponding to the plurality of search conditions.

3. The information presentation apparatus as claimed in claim 1, wherein said search condition creating means operates to represent said term through the AND operation of key words and replace the term inside of said search condition with the representation.

4. The information presentation apparatus as claimed in claims 3, wherein said search condition creating means operates to search a synonym of the key word composing said term, represent said key word through the OR operation of said key word and its synonym, and replace the key word with the representation.

5. The information presentation apparatus as claimed in claim 2, wherein said information collecting means operates to temporarily store data if said data is transmitted from one of said computers provided with said information storing means distributively located on said communications network, search said data under said search condition, and store location information of said data units meeting said search condition.

6. The information presentation apparatus as claimed in claim 2, wherein the location information of said data consists of an identifier of one of said computers located in said communications network and an identifier of the data saved in said computer.

7. An information presentation apparatus for presenting information in accordance with a search condition that corresponds to an information collection unit for collecting information, comprising:

information organization structure editing means for storing an information organization structure indicating a relation between terms in a first one of a plurality of search conditions and terms in a second one of the plurality of search conditions;

search condition creating means for accepting input of a plurality of terms constituting the search condition and creating the plurality of search conditions based on the plurality of input terms and the stored information organization structure;

information collecting means for searching information storing means by using said created search conditions and collecting information corresponding to the plurality of seach conditions, wherein said information organization structure is composed of information organization elements served as sub units and said information organization structure editing means prompts a user to enter plural terms and one or more relations among said terms, stores them as the information organization elements, prompts a user to enter one or more relations among said information organization elements, and store said relations as an information organization structure, wherein said information organization element may take any type of a tree type having the terms located in a tree structure, a table type having the terms located in the items of a table structure, a map type having the terms located in a given picture, a tour type having the terms defined in a certain order, and a hyper type arranged to connect between any two terms by an arrow, input means for accepting an input of a user; and selecting means for selecting the type of the information organization element from the tree type, the table type, the map type, the tour type and the hyper type in response to the input of the user.

8. The information presentation apparatus, as claimed in claim 7, wherein the information organization element includes a plurality of types, and at least one of the plurality of types indicates an additional relation among said terms, the additional relation includes at least one of order relation indicating order of said terms and position relation indicating positions of said terms.

* * * * *